Patented Feb. 21, 1950

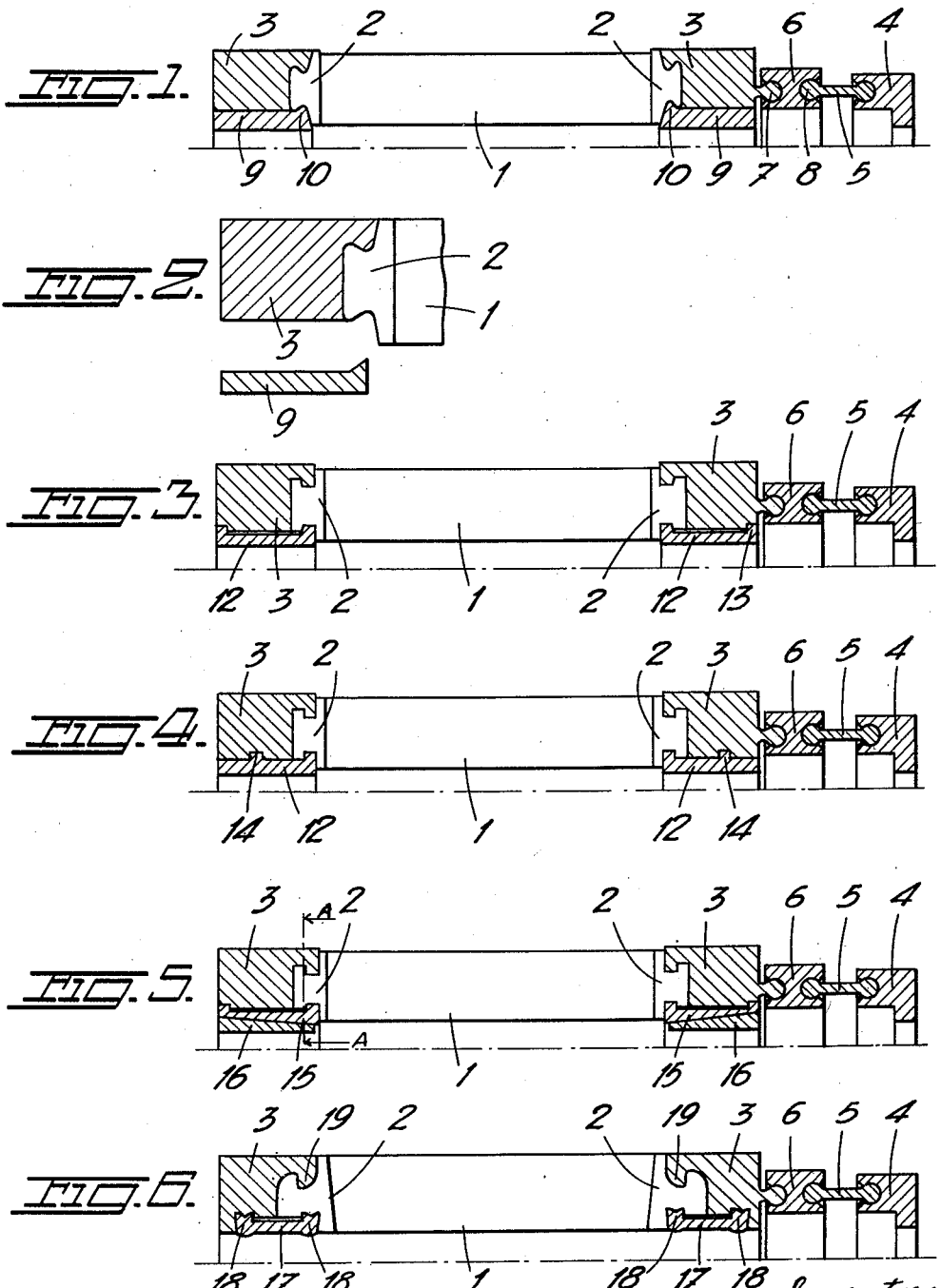

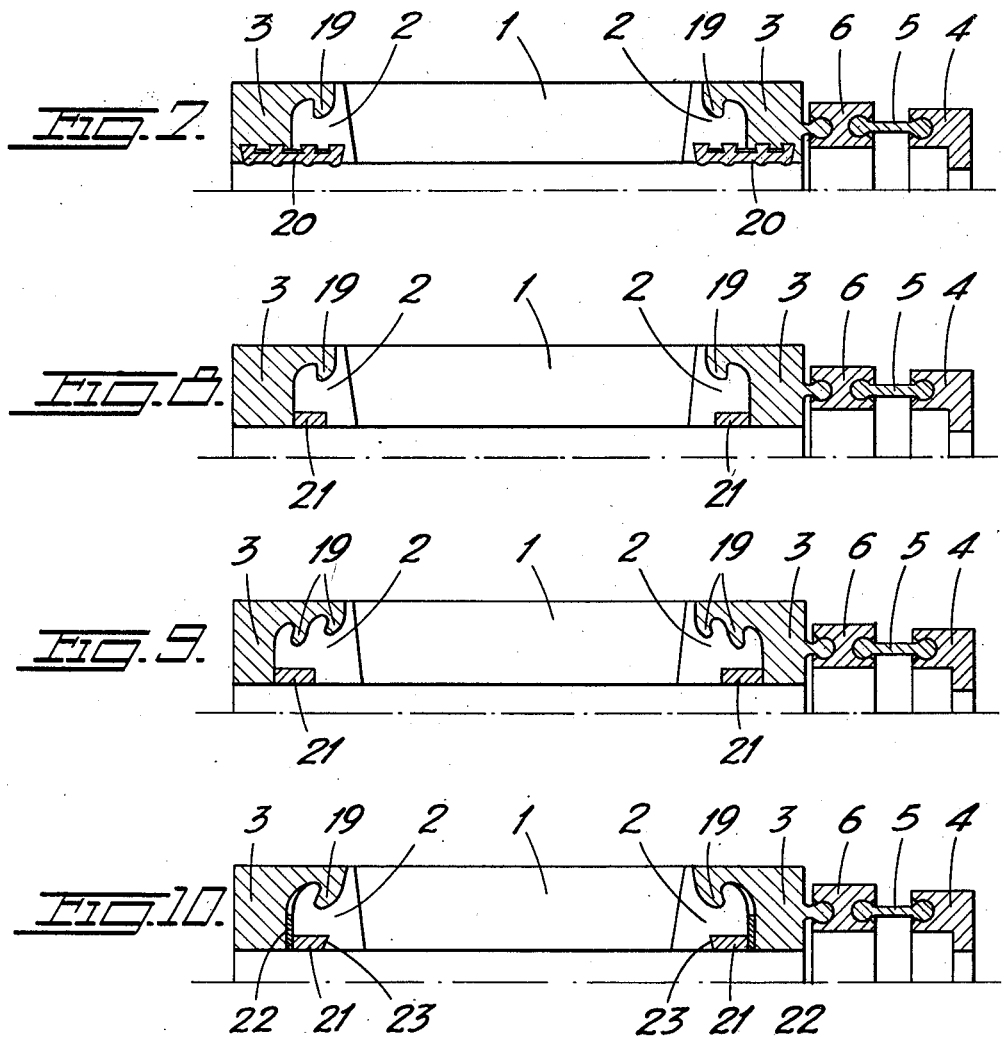
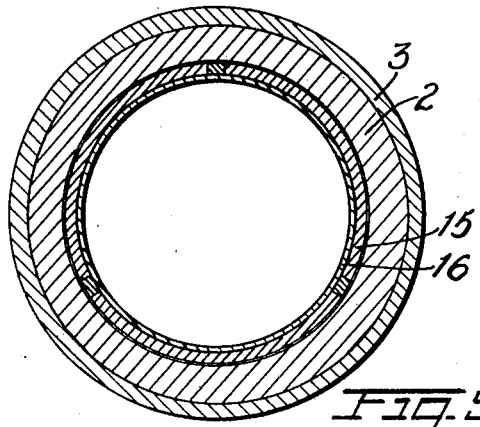
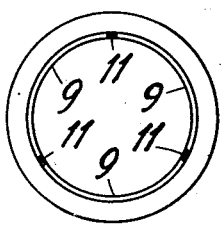

2,498,425

UNITED STATES PATENT OFFICE 2,498,425

BLADE RING FOR RADIAL-FLOW ELASTIC FLUID TURBINES

Axel Konrad Johansson, Erik David Lindblom, and Hans Ingvar Olof Ohlberger, Finspong, Sweden Application July 17, 1945, Serial No. 605,527
In Sweden July 5, 1944

Section 1, Public Law 690, August 8, 1946
Patent expires July 5, 1964

1 Claim. (Cl. 253—91)

The present invention relates to blade rings for radial flow elastic fluid turbines, and more particularly to blade rings of the type comprising two or more supporting rings in expansible connection with turbine discs to be carried thereby, and blades inserted between said supporting rings.

Several methods are already known in which to produce such blade rings. One method comprises individually stamping the blades out from a section of iron, properly shaping the ends of the stamped blades to allow their insertion into openings of two shroud rings, welding the inserted ends to said shroud rings, giving the shroud rings a dove-tail profile by turning them in a lathe and connecting them to the supporting rings by a rolling operation.

Another well known method of manufacturing the blade rings includes connecting the blades directly to the supporting rings without the aid of shroud rings. According to said other method the blades are provided with a root at each end which roots, if desired, may be shaped to act as distance pieces, whereupon the outermost portions of the roots are shaped as dove-tails and connected at both ends to a supporting ring by a rolling operation.

Both of these methods suffer from drawbacks. Operation according to the said first-mentioned method requires the use of a weldable material of sufficient strength for the blades.

Though in operating according to the other method finished blade rings may be obtained in cold state, that is to say, without welding or heating, yet it is necessary to bend the material on opposite sides of the dove-tail grooves inwards and cause it by rolling to firmly embrace the dovetail roots of the blades. This rolling operation requires a material for the supporting rings which is particularly well adapted for rolling.

The present invention has for its object to provide a blade ring which may be manufactured without the use of welding and without the need of any deformation by rolling of the material of the supporting rings in contact with the dovetail projections. These circumstances permit manufacturing the supporting rings from the material that is best suited to the purpose from the strength point of view. No compromise in order to satisfy the requirements as to the welding and rolling qualities of the material need be taken into consideration.

The invention is characterized, chiefly, by the fact that the ends of the blades are formed with outwardly projecting hook-shaped portions engaging correspondingly shaped grooves in the supporting rings and sealed in this engagement by means of locking rings bearing against the inside of the blade ends.

The invention permits a reliable mounting of expansibly supported blade rings whereby the action of the centrifugal force on the blade tensile strains are produced at the outermost portion of the fastening due to the tendency of the supporting rings to twist in following the blade roots. The hook-shaped engagement allows this occurrence without hazarding the safe connection between the blade roots and the supporting rings.

In the accompanying drawings, Fig. 1 is a sectional view of a turbine blade assembly including supporting rings and seating and sealing elements.

Fig. 2 is an enlarged sectional view of part of a modified blade ring and the associated blade root, the ring being shown in partly exploded condition.

Figs. 3 and 4 and 6 to 10 are sectional views of further modified blade rings.

Fig. 5 is a diagrammatic view illustrating a manner of securing the blade root in a ring.

Fig. 5a is a sectional view on line A—A of Fig. 5.

Fig. 11 is a diagrammatic reduced scale view illustrating the use of a locking ring in several parts.

With reference to the drawing, the numeral 1 designates a blade formed with a dove-tail root 2 at each end. Said roots fit in grooves of two supporting rings 3. One supporting ring is connected to a seating ring 4 adapted to be attached as by caulking to a turbine disc, not shown, said connection being effected by means of an expansion ring 5 and an auxiliary ring 6 caused by rolling to clamp bulbs 7 and 8 of the supporting ring 3 and the expansion ring 5, respectively. If desired, rings 6 and 5 may be formed integrally with one another. Ring 6 should be of a more soft and more readily rolled material than that of the supporting rings. The blade 1 is clamped at each end between the respective supporting ring 3 and a special locking ring 9 bearing against the inside of the supporting ring and the root of the blade in such a way as to secure a rigid and safe fastening of the blade root to the supporting ring. Ring 9 may be undivided all around and made from a soft material, as supposed in Fig. 1, in which case it is pushed axially into the respective supporting ring, whereupon the ridge 10 is forced by rolling into engagement with the root of the blade at the same time that the ring as a whole is forced by rolling against the inner cylindrical surface of the supporting ring. The sealing of ring 9 to the supporting ring may be effected in any well-known way, as for instance, by upsetting of material, spot welding or the like.

Ring 9, however, need not be of a soft material, if, as shown in Figs. 2 and 11, it comprises a number of segments, which may be placed inside the supporting ring. As shown in Fig. 11, the ring 9 may comprise three segments, by slitting it at three points, but it may also be slit at a single point only. After the ring segments are placed in their proper positions, a suitable sort of material is caulked into the clearances at the joints, as shown at 11 in Fig. 11. The clearances at the joints may, if desired, be filled with a welding material, while the ring segments are forced by any suitable means against the supporting ring. In Fig. 2 a ring segment 9 is shown prior to its applying to the ring 3 and the blade root 2.

Figs. 3 and 4 illustrate locking rings 12 as locked to the supporting rings against axial displacement by means of coengaging flange and slot, as shown at 13 and 14 respectively.

In order to obtain a sufficient pressure at the bearing surfaces between the locking ring, as 15, Fig. 5, and the blade roots an undivided ring 16, as shown in Fig. 5, may be driven axially into the divided locking ring 15 in order to force the segments thereof outwards. In this case the bearing surfaces of the two rings are conical.

As shown in Fig. 6, the segments of the locking ring 17 may be formed with peripherally extending ridges 18 fit into corresponding slots in ring 3 and blade root 2. The ridges 13 are caused by rolling to fill up the conical slots. By this means the blade root is forced against the hook 19 of the supporting ring so as to firmly engage therein. Said coengaging slots and flanges together with the engagement effected by means of the hook 19 do also act to withstand the bending moments as produced by the peripheral forces.

Fig. 7 shows a locking ring 20 having a double set of ridges like 18 in Fig. 6 fitted into the supporting ring 3 and the blade root 2, respectively. Here, it is preferred to use a sort of material for the locking ring which is easily rolled.

Some further modifications are shown in Figs. 8, 9 and 10, in all of which the locking rings, being of substantially the same structure, are designated by reference numeral 21.

In Figs. 8 and 9 locking rings 21 of rectangular cross section are shown.

Fig. 9 shows a supporting ring 3 having two hooks like 19.

In Fig. 10 the reference numeral 22 designates a sheet metal ring or the like adapted to force blade root 2 against the hook 19 and locking ring 21 against the conical surface 23 of the blade root. Said ring 22 is sealed by caulking after the blades and the locking ring 21 have been placed in their proper positions and serves to lock said members to each other.

In manufacturing blade rings according to the invention, the blades may be placed in the supporting rings either individually or in groups. By means of a suitable fixing device for lathes groups of blades after turning their roots to the profile desired, may be moved to the supporting rings without changing their positions with relation to each other. Another method involves shrinking the supporting rings onto the blade roots while the blades after turning of their roots are still clamped in the fixing device. In order that the ring 9 may press upon the blade roots by a sufficient force, the supporting ring may be heated during the mounting operation to such a temperature as to produce the contact pressure desired, or the locking ring may for the same purpose be cooled during the mounting operation.

The blades may be provided with distance pieces or formed with roots or welded to shroud rings which are then worked with a view to produce the profile desired. Of course, the invention may also be applied to so called drum rings comprising two or more segments. Finally, the blades may be fastened according to the invention at one end only, whereas the other end may be fastened in any other way.

What we claim is:

A blade ring for radial flow elastic fluid turbines comprising, two supporting rings, at least one of which is expansibly connected to a turbine disc so as to be carried thereby, blades inserted between said supporting rings, said blades having outwardly extending hook-shaped end portions for engaging correspondingly shaped grooves in the supporting rings in order to hold the blades against moving outwardly with relation to the supporting rings, and slit locking rings for holding the blades against moving inwardly with relation to the supporting rings, and undivided rings for keeping said slit locking rings in position against the ends of the blades, said undivided rings being axially driven into their positions, the bearing surfaces between the locking rings and said undivided rings being conical.

AXEL KONRAD JOHANSSON.
ERIK DAVID LINDBLOM.
HANS INGVAR OLOF OHLBERGER.

REFERENCES CITED

The following references are of record in the file of this patent:

UNITED STATES PATENTS

| Number | Name | Date |
|--------|------|------|
| 876,422 | Zvonicek | Jan. 14, 1908 |
| 902,915 | Roth | Nov. 3, 1908 |
| 927,658 | Kemble | July 13, 1909 |
| 1,061,754 | Knape | May 13, 1913 |
| 1,063,331 | Dake | June 3, 1913 |
| 1,313,058 | Bonom | Aug. 12, 1919 |
| 1,562,970 | Kasley | Nov. 24, 1925 |
| 1,669,797 | Wiberg | May 15, 1928 |
| 1,966,041 | Nelson | July 10, 1934 |
| 2,173,721 | McGee | Sept. 19, 1939 |

FOREIGN PATENTS

| Number | Country | Date |
|--------|---------|------|
| 319,323 | Great Britain | Mar. 6, 1930 |
| 606,029 | Germany | Nov. 23, 1934 |
| 719,924 | France | Feb. 12, 1932 |